United States Patent [19]

Eberhardt

[11] 4,064,891
[45] Dec. 27, 1977

[54] PLURAL FLUID PROPORTIONING APPARATUS

[75] Inventor: H. Alfred Eberhardt, Paoli, Pa.

[73] Assignee: Hale Fire Pump Company, Conshohocken, Pa.

[21] Appl. No.: 644,063

[22] Filed: Dec. 24, 1975

Related U.S. Application Data

[63] Continuation-in-part of Ser. No. 477,156, June 6, 1974, abandoned.

[51] Int. Cl.² .............................................. G05D 11/00
[52] U.S. Cl. ..................................... 137/98; 137/605; 137/532
[58] Field of Search ................... 137/605, 532, 98, 88; 169/15, 16

[56] References Cited

U.S. PATENT DOCUMENTS

| 354,835 | 12/1886 | Korting | 137/605 |
|---------|---------|---------|---------|
| 974,245 | 11/1910 | Donnelly | 137/532 |
| 2,211,058 | 8/1940 | Guthmann | 137/88 |
| 3,647,002 | 3/1972 | Lindsay | 137/98 X |

*Primary Examiner*—William R. Cline
*Attorney, Agent, or Firm*—Eugene E. Renz, Jr.

[57] ABSTRACT

Apparatus is provided for admixing a relatively small quantity of one fluid with a larger quantity of another fluid in a proportion which remains relatively constant over a wide range of demand flow rates for the mixed fluids. The apparatus comprises a body having an inlet cavity and an outlet chamber in fluid communication therewith through an annular port. A disc-like valving member is mounted for displacement vertically in the chamber into elevations which depend on the rate at which a primary fluid flows through the annular port. A reservoir for a secondary fluid has an upwardly-open orifice and is located interiorly of the annular port. The valving member has a central tapered plug which depends into the reservoir-orifice, and the valving member is weighted so as to be biased downwardly by a constant pressure into a normally-closed position blocking fluid flow through the annular port. The elevation of the valving member in the chamber locates the plug relative to the orifice to vary the effective flow area of the orifice to insure the mixing of a metered amount of the secondary fluid with the primary fluid throughout a wide range of demand flow rates.

A balanced pressure bypass valve which is particularly useful in conjunction with the above apparatus in a firefighting system is also disclosed.

29 Claims, 7 Drawing Figures

PLURAL FLUID PROPORTIONING APPARATUS

This is a continuation-in-part of my prior application, Ser. No. 477,156 for "PLURAL FLUID PROPORTIONING APPARATUS" filed June. 6, 1974, now abandoned.

BACKGROUND OF THE INVENTION

The present invention relates to apparatus for admixing plural fluids, and more particularly, the present invention relates to apparatus for admixing a foam solution with water in a predetermined proportion in a foam-water fire fighting system.

The present invention is described in Disclosure Document No. 018,855 filed May 2, 1973.

In foam-water fire fighting systems, the demand for the foam-water mixture can be expected to vary considerably, depending upon the rate of application of the mixture. For instance, it is not uncommon for the flow rate to vary from as low as 50 gpm to as high as 1,000 gpm during fire fighting operations. In order to ensure satisfactory results, the foam should be mixed with water in a predetermined proportion, and the proportion should be relatively constant over this entire flow range. Usually when an AFFF foam is employed, the foam is mixed with water in a ratio of 6/94 in suitable mixing apparatus connected in the supply line. In order to maintain adequate pressure at the nozzle to ensure proper distribution of the mixture, the apparatus which admixes the foam with the water should create a minimum of pressure drop in the supply line.

An example of apparatus which is used to admix a foam solution with water in a foam-water fire fighting system is disclosed in U.S. Pat. No. 3,647,002. Although the patented apparatus may function satisfactorily, it has a number of moving parts, and hence it is relatively complex. Because of the complexity, the patented apparatus may not be as reliable as a simpler structure would be. In addition, the patented valve structure is spring-loaded into a closed position. Hence, the water must act against increasing spring pressure as the water flow rate through the valve increases, and this has the effect of increasing the pressure drop across the valve at higher flow rates and reducing pressure at the discharge nozzle. As a result, the effectiveness of distribution of the mixture may be significantly impaired.

With the foregoing in mind, it is a primary object of the present invention to provide novel apparatus for admixing a primary fluid with a secondary fluid in a relatively constant proportion over a wide range of flow rates of the mixed fluids.

It is another object of the present invention to provide improved apparatus for admixing a foam solution with water in a foam-water fire fighting system in manner which accurately meters the amount of foam mixed with the water to ensure an optimum proportion of foam to water over a wide range of flow rates of the foam-water mixture.

It is a still further object of the present invention to provide plural fluid proportioning apparatus which operates with a minimum of pressure drop through the apparatus over a wide range of flow rates through the apparatus.

As a further object, the present invention provides unique foam-water mixing apparatus which is relatively simple in construction so as to be highly reliable and relatively trouble-free in operation.

A further object of the present invention is to provide a simple plural fluid proportioning valve wherein the mixing proportion may be changed relatively easily.

It is still another object of the present invention to provide a novel balanced-pressure valve. As yet another object, the present invention provides a unique valve which is biased by gravity into a closed position.

More specifically, in the present invention, apparatus is provided for admixing a primary fluid with a secondary in a predetermined proportion over a wide range of flow rates of the fluid mixture. To this end, the apparatus comprises a body having an inlet cavity, an outlet chamber which overlies the inlet cavity, and a free-floating disk-like valving member mounted in the outlet chamber. An annular port is provided between the cavity and the chamber, and a reservoir having an orifice opening upwardly into the chamber is provided in the cavity interiorly of the annular port. The secondary fluid is supplied to the reservoir at a relatively constant pressure corresponding to the pressure of the primary fluid at the inlet cavity. The valving member extends across the annular port and has a tapered plug which depends into the orifice, and the valving member carries a mass of a predetermined weight which biases the member into a position blocking fluid flow through the annular port. A primary fluid flows upwardly through the annular port and laterally out of the chamber, and as the primary fluid flows, it elevates the valving member into a position corresponding to its rate of flow. As the valving member moves vertically in response to changes in the primary fluid flow rate, the area between the plug and the reservoir orifice also varies to ensure mixing of a precise amount of secondary fluid with primary fluid in the mixing chamber. With this structure, the pressure drop across the apparatus remains relatively constant over a wide range of flow rates.

The present invention also provides a balanced pressure valve which is particularly useful in combination with the above proportioning valve to supply the secondary fluid to the reservoir at a pressure corresponding to the supply pressure of the primary fluid. The valve is designed to bypass secondary fluid to its supply tank in response to changes in pressure of the primary fluid at the inlet to the apparatus as determined by a pressure-responsive diaphragm connected to a valve operator. The valve has a spool and neck which are slidable axially relative to spaced outlets in response to movement of the diaphragm. The spool, neck and operator are diminsioned relative to one another to prevention pressure forces from adversely affecting movement thereof.

BRIEF DESCRIPTION OF THE DRAWINGS

These and other objects, features and advantages of the present invention should become apparent from the following description when taken in conjunction with the accompanying drawings in which.

DESCRIPTION OF THE PREFERRED EMBODIMENTS

Figure 1:
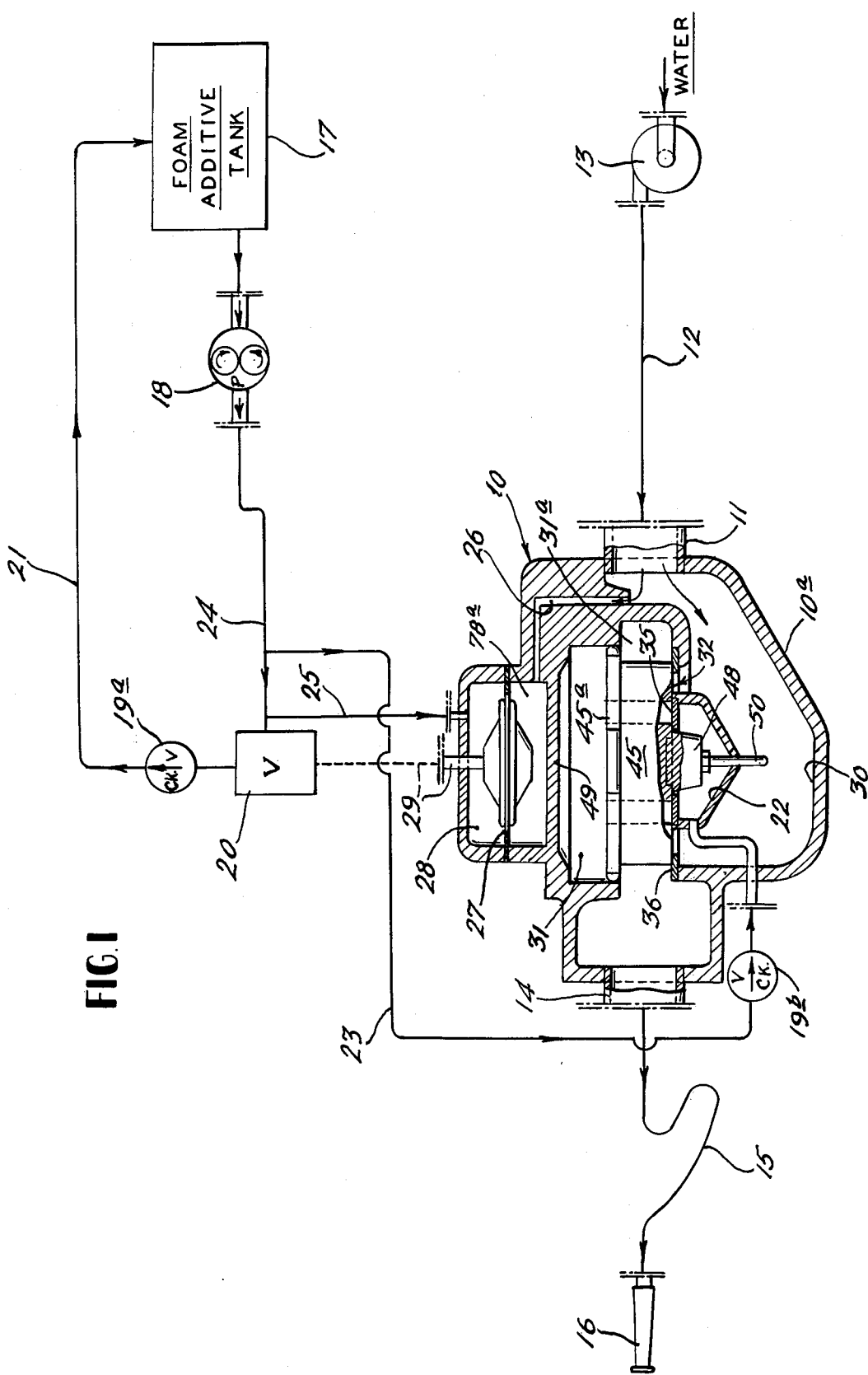
FIG. 1 is a schematic diagram of a foam-water fire fighting system having plural fluid proportioning apparatus embodying the present invention.
Figure 3:
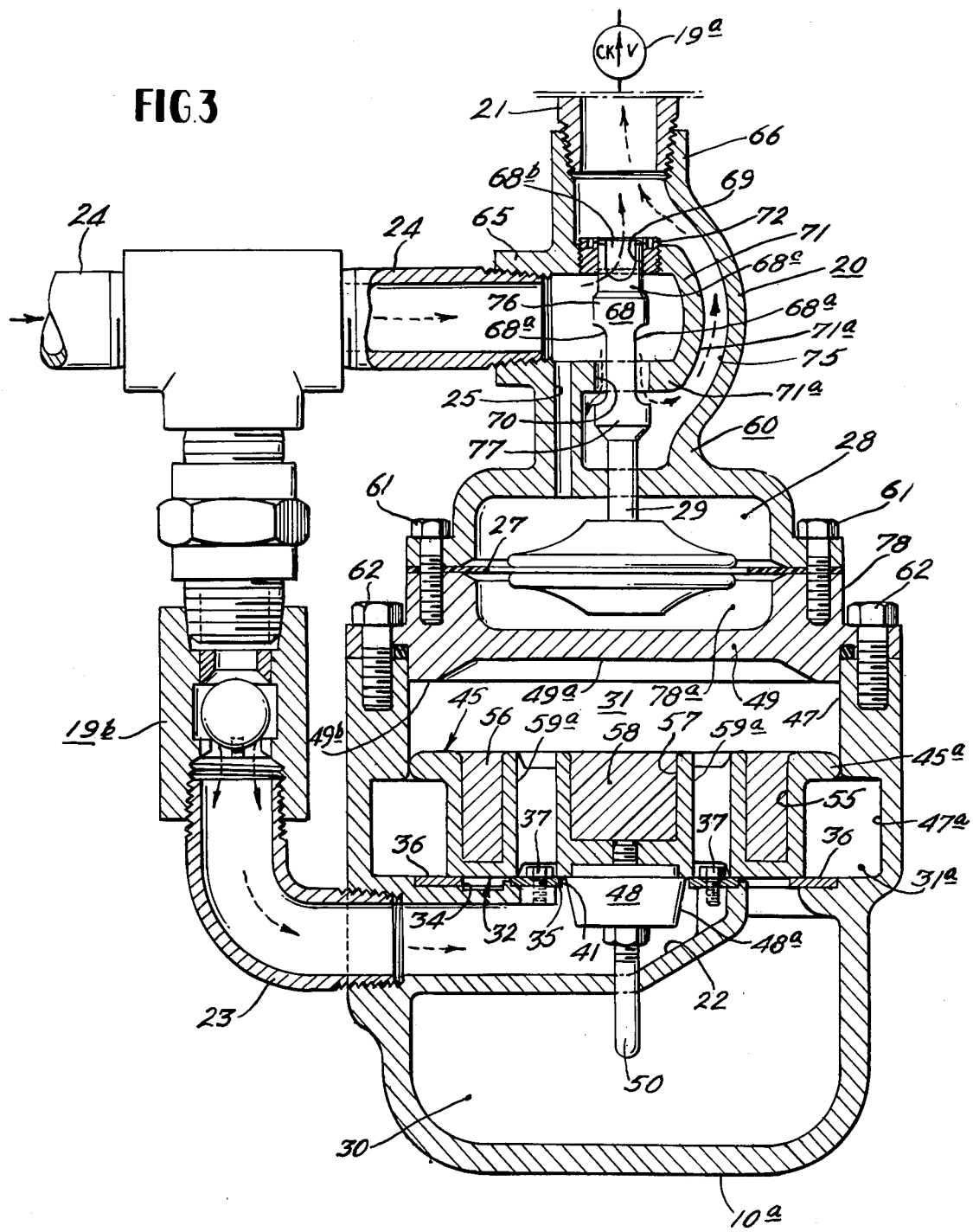
FIG. 3 is a sectional view taken along line 3—3 of FIG. 2.

Referring now to the drawings, FIG. 1 illustrates a foam-water fire fighting system in which the proportioning apparatus 10 of the present invention finds particular utility. As seen therein, the proportioning apparatus 10 has an inlet 11 which is connected by a conduit 12 to the outlet of a pump 13 which in turn in connected to a source of a primary fluid such as water. The proportioning apparatus 10 has an outlet 14 which is connected by means of a flexible hose 15 to a discharge nozzle 16. A secondary fluid such as a liquid foam additive is contained in a storage tank 17 and is supplied to the proportioning apparatus 10 under pressure by a pump 18 which is connected by a conduit 24 to a bypass valve 20. The bypass valve 20 is connected by a conduit 21 through a so-called sinking ball check valve 19a to the foam additive tank 17 for returning the liquid foam additive to the tank 17 when actuated. The liquid foam additive is supplied to a reservoir 22 contained within the apparatus 10 by a supply conduit 23 which is connected to the conduit 24. A so-called floating-ball check valve 19b is connected in the conduit 23 adjacent the reservoir 22 as illustrated in FIG. 3.

The foam additive is supplied to the reservoir 22 at a pressure corresponding to the pressure of the water at the inlet 11. To this end, there is provided means for sensing the delivery pressure of both the liquid foam and the water, means for comparing the sensed pressures, and means for actuating the bypass valve 20 in response to changes in the relative pressures. In the illustrated embodiment, the pressure of the foam solution is sensed by a conduit 25 connected adjacent the inlet to the bypass valve 20, and the pressure of the water at the inlet 11 of the proportioning apparatus 10 is sensed by a passage 26 in the apparatus 10. The sensed pressures are communicated to opposite sides of a diaphragm 27 mounted inside a pressure comparing chamber 28. The diaphragm 27 is connected by a vertically-disposed operator 29 to the bypass valve 20. As will be described more fully hereinafter, the valve 20 is internally balanced and is constructed to cause a quantity of foam solution to be returned to the tank 17 when the water pressure at the inlet 11 drops relative to the foam additive pressure and the diaphragm 27 moves downwardly in the chamber 28. By returning some of the foam additive, the pressure in the supply conduit 23, and hence in the reservoir 22, drops in a predetermined relation to the drop in pressure of the water at the inlet 11. Of course, an increase in the water pressure at the inlet 11 causes the diaphragm 27 to move upwardly in the chamber 28 for actuating the bypass valve 20 to cause more foam additive to flow through the supply conduit 23 to the reservoir 22 for increasing the pressure of the foam solution in the reservoir 22.

The proportion of foam additive to be admixed with water depends upon the type of foam additive utilized. For instance, when a so-called AFFF foam liquid is admixed with water, the optimum proportion for foam additive to water is 6 parts of foam liquid to 94 parts of water. In fire fighting operations, it is important for this ratio to be maintained relatively constant without regard to the demand for the foam-water mixture and without regard to fluctuations in the water pressure supplied to the proportioning apparatus. In addition, it is important for the proportioning apparatus 10 to create a minimum of pressure drop in the supply line to the hose nozzle 16 in order to insure adequate pressure to distribute the foam-water mixture effectively.

According to the present invention, the apparatus 10 is capable of mixing with the primary fluid or water a predetermined amount of the secondary fluid or foam additive in a relatively-constant proportion over a wide range of demand flow rates for the foam-water mixture. To this end, the proportioning apparatus 10 (FIG. 2) has a cast body 10a with an interior cavity 30 which is in fluid communication with the inlet 11 which is flanged for connection in a piping system. The body 10a of the apparatus 10 also has a chamber 31 which overlies the cavity 30 and which is in fluid communication with the outlet 14 which is also flanged. Fluid communication is provided between the cavity 30 and the chamber 31 by an annular port 32 which, in the illustrated embodiment, is defined between spaced confronting edges 33 and 34 of a circular inner plate 35 and an annular outer plate 36, respectively. The plates 35 and 36 are disposed coplanar, and they extend horizontally between the chamber 31 and the cavity 30. The plates 35 and 36 are releasably fastened in the body of the apparatus 10 by means of a plurality of bolts, such as the bolts 37,37, and 38,38, respectively, in order to afford ready removal and replacement for changing the proportion of the mixture. The reservoir 22 is located interiorly of the annular port 32, and the inner plate 35 has a circular orifice or port 41 which provides fluid communication between the interior of the reservoir 22 and the chamber 31. With this structure, water flows laterally into the cavity 30 and upwardly through the annular port 32 into the chamber 31 from which it flows laterally outward to the outlet 14. In a similar manner, the foam liquid flows upwardly through the orifice 41 in the reservoir 22 and mixes with the water in the chamber 31 before flowing through the outlet 14.

Figure 2:
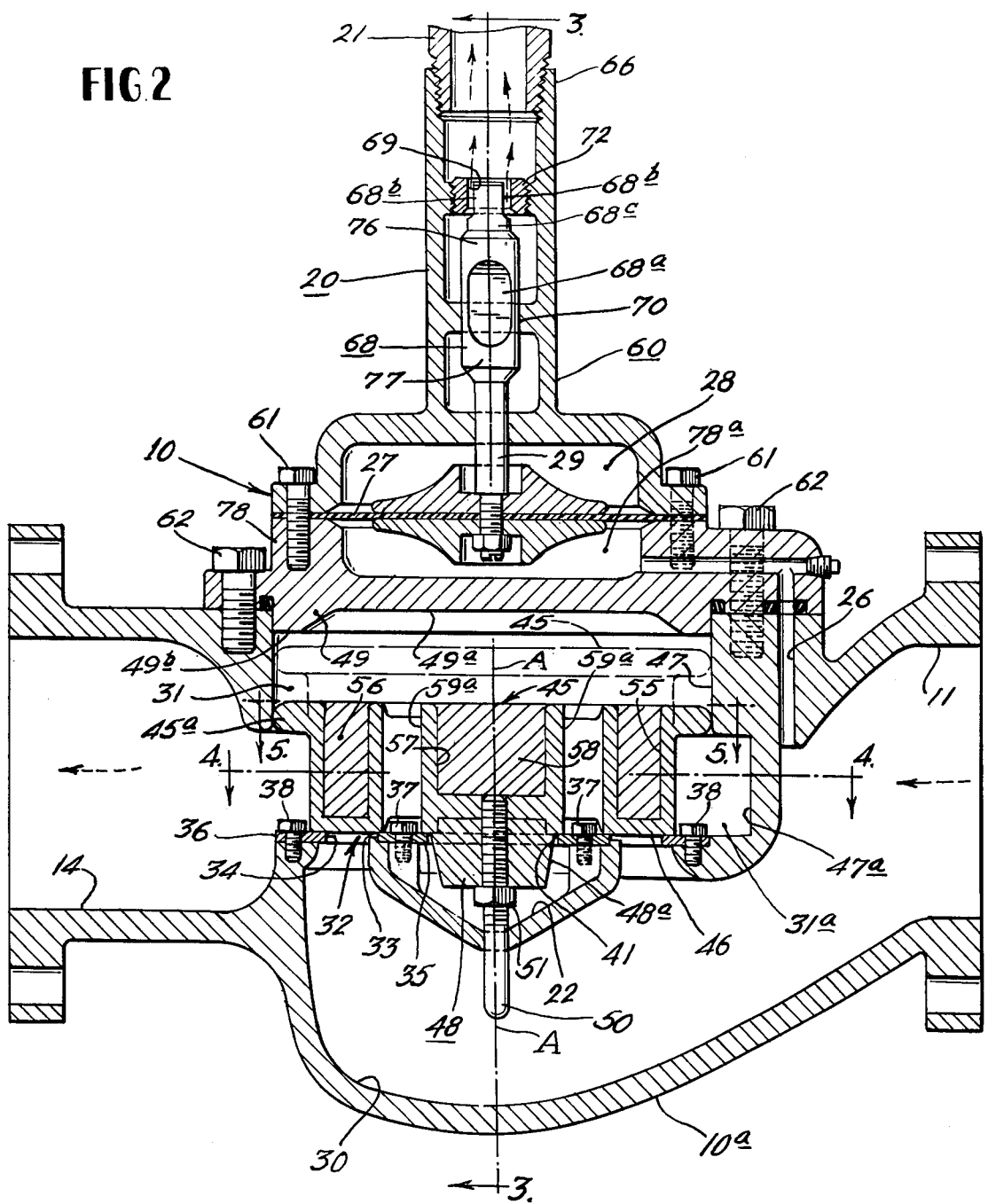
FIG. 2 is a longitudinal sectional view of the proportioning apparatus of the present invention.
Figure 4:
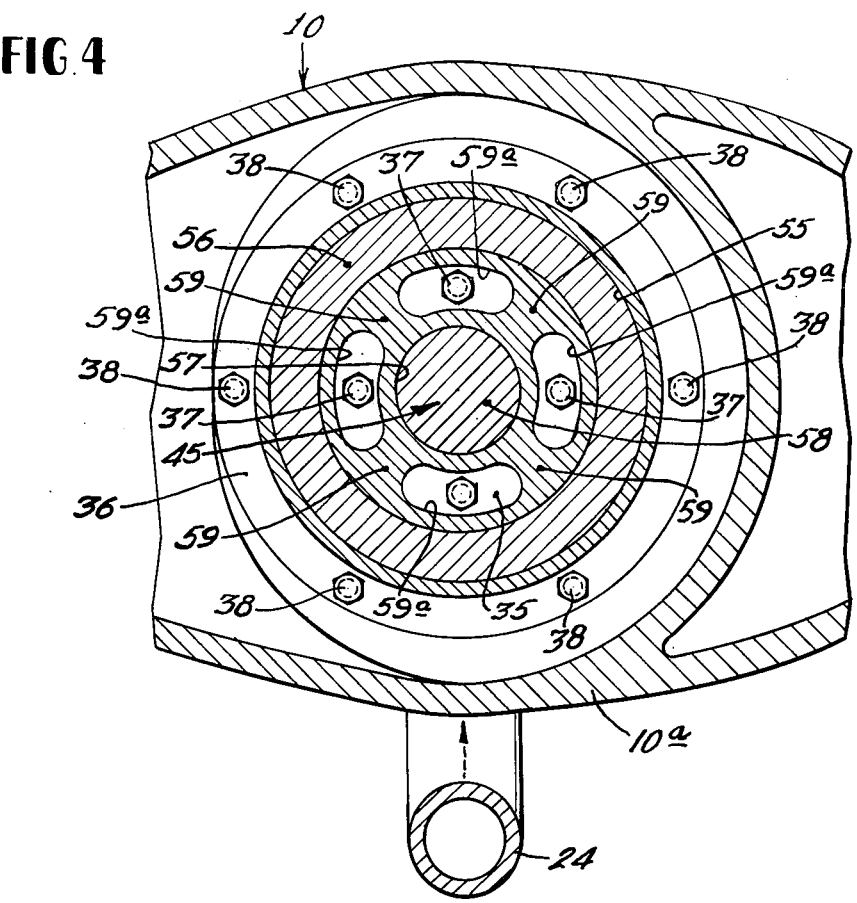
FIG. 4 is a sectional view taken along line 4—4 of FIG. 2.

In order to effect accurate metering of the liquid foam with the water in the mixing chamber 31, a disk-like valving member 45 is mounted for vertical displacement in the chamber 31. As best seen in FIGS. 2 and 4, the valving member 45 has a cylindrical configuration symmetrical with respect to a central axis A extending in its direction of movement. The valving member 45 has a planar annular bottom surface 46 which spans across the annular port 32 and seats against the upper surfaces of the plates 35 and 36 when the valving member 45 is in its lower limit position. When in this position, the valving member 45 blocks the flow of water through the annular port 32.

The valving member 45 also has a tapered plug 48 which depends downwardly below the plates 35 and 36 and through the orifice 41 into the interior of the reservoir 22. The plug 48 has a frusto-conical peripheral surface 48a which tapers at a predetermined angle with respect to the axis A, the taper angle being related to the area of the orifice 41 in a prescribed mathematical relationship as determined by the desired foam-water proportion. The plug 48 has an axial dimension which corresponds to the displacement of the valving member 45 in the chamber 31, and the upper end or base is dimensioned so as to be received within the orifice 41 with a slight clearance. Thus, the area between the surface 48a of the plug 48 and the orifice 41 depends upon the elevation of the valving member 45 in the chamber 31, and the elevation of the valving member 45, in turn, is dependent upon the rate of flow of water upwardly through the annular port 32. As the flow rate of water increases the valving member assumes higher elevations in the chamber 31 to increase the area between the orifice 41 and the peripheral surface 48a of the plug 48. As a result, an increased amount of foam solution is permitted to flow into the chamber 31 for admixing with the water as the water flows laterally to the outlet 14 along the underside of the valving member 45. Of course, as the water flow rate decreases, the valving member moves downwardly, and the plug 48 cooperates with the orifice 41 to permit a smaller quantity of foam additive to mix with the water. With this structure, the valving member 45 tends to float on the current of water flowing through the annular port 32, and this action creates a minimum of interference with the flowing water. Thus, the pressure drop of the water as it flows through the proportioning apparatus 10 is minimized, thereby maximizing the delivery pressure of the foam-water mixture at the nozzle 16.

In the illustrated embodiment, the taper angle of the plug 48 is constant; however, there may be occasions when it is desirable for the taper angle to vary along the length of the plug. For instance, it may be desirable for the taper angle to be increased adjacent the lower end of the plug in order to provide an increased orifice flow area at greater water flow rates. This would have the effect of increasing the proportion of foam additive to water at higher water flow rates to richen the foamwater mixture. Of course, the taper angle could also be decreased to provide a leaner mixture at higher flow rates, if desired.

The valving member 45 is guided vertically in the chamber 31, and there is provided means to limit its upward movement therein. To this end, the valving member 45 has a radially-extending peripheral flange 45a around its upper end, and the chamber 31 is defined by a cylindrical wall 47 which slidably receives the flange 45a of the valving member 45. A wall 49 defines the top of the chamber 31 and extends transversely to the path of movement of valving member 45. The wall 49 has a central recessed portion 49a and an annular peripheral shoulder 49b located adjacent the cylindrical wall 47. The shoulder 49b provides an abutment surface for engaging the upper surface of the peripheral flange 45a of the valving member to limit its upward movement in the chamber 31. Preferably, the shoulder 49b is located so as to prevent the lower end of the plug 48 from elevating above the orifice when the valving member is in its upper limit position.

Figure 5:
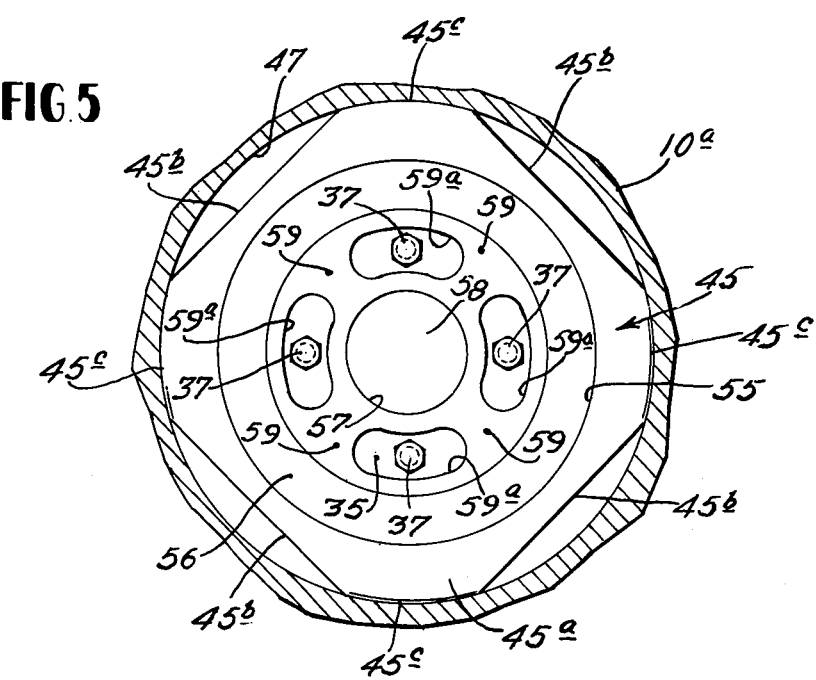
FIG. 5 is a sectional view taken along line 5—5 of FIG. 2.

The proportioning apparatus 10 is relatively compact, affording installation in environments where there are critical spatial limitations, such as on board a ship. To this end, the valving member 45 has a disk-like configuration with a dimension along the axis A less than its diameter. The flange 45a is relatively thin as compared with the thickness of the valving member 45, and as best seen in FIG. 5, the flange 45a has a series of flats or recesses 45b,45b around its periphery defining a plurality of peripherally-spaced extensions 45c,45c on the flange 45a. The tips of the extensions 45c,45c engage the inner wall surface 47 of the chamber 31, and the recesses 45b,45b confront the surface 47 and provide flow passages into the chamber 31 from the underside of the valving member 45 for purposes to be described hereinafter.

In order to prevent the valving member 45 from gilting as it moves vertically in the chamber 31, the valving member 45 is provided with a pilot pin or stem 50 which depends from the valving member 45 and which is slidably received in a bearing or bore in the bottom of the reservoir 22. In the illustrated embodiment, the stem 50 is disposed coaxially with the longitudinal axis A of the valving member 45 and has a length greater than the displacement distance of the valving member 45. Preferably, the stem is threaded into the bottom of the valving member 45 and secured by a nut 51 which engages the bottom surface of the frusto-conical tapered plug 48. By virtue of this structure, the stem 50 operates to prevent the valving member 45 from tilting as it elevates in the chamber 31. Moreover, the plug 48 may be readily removed and replaced in the event it becomes desirable to change the foam-water proportion.

The valving member 45 is biased downwardly into the full-line position illustrated in FIG. 2 for blocking fluid flow through the annular port 32 and the orifice 41. In the present invention, the downward bias is provided by a means which applies a substantially constant force to the valving member 45 in the direction of the lower cavity 30 regardless of the elevation of the valving member 45 in the chamber 31. To this end, the valving member 45 carries a mass of a predetermined weight which biases the valving member 45 downwardly by gravity against the seats provided by the plates 35 and 36.

In the illustrated embodiment, the valving member 45 is fabricated of steel or cast iron and has an upwardly-open peripheral channel 55 which is filled with a quantity 56 of denser material, such as lead. The valving member 45 also has an upwardly-open central recess 57 which is also filled with a quantity of lead 58. As best seen in FIG. 4, the peripheral channel 55 is connected to the inner recess 57 by a plurality of radially-extending webs 59,59, and as best seen in FIG. 2, the flat lower surface of the valving member 45 is recessed intermediate the inner recess 57 and the peripheral channel 55 to accomodate the heads of the plate-mounting bolts 37 and 37 when the valving member 45 is in its downwardmost flow-blocking position. By virtue of this structure, the valving member 45 has a center of gravity which is located below its flange 45a, and a relatively constant force is applied downwardly to the valving member 45 irrespective of its elevation in the chamber 31. As a result, the biasing force on the valving member 45 does not increase with increased flow rates, so that the pressure drop through the proportioning apparatus 10 remains relatively constant over a wide range of demand flow rates. Accordingly, adequate pressure at the nozzle is maintained to effect proper distribution of the foam-water mixture.

The valving member 45 is designed to unseat when a pressure differential of approximately 2 psi is applied across the inlet 11 and the outlet 14 of the proportioning apparatus 10. In addition, the apparatus is designed so that rapid oscillatory movement of the valving member 45 in the chamber 31 is minimized. For this purpose, a plurality of apertures, 59a,59a are provided in the valving member 45 intermediate the webs 59,59. The apertures 59a,59a permit a small qunatity of water to flow upwardly therethrough into the upper portion of the chamber 31 as soon as the valving member 45 moves away from its seat a slight amount due to a pressure differential applied across the inlet and the outlet. In addition, the recesses 45b,45b permit water to flow upwardly into the chamber above the valving member 45 and to drain therefrom into the outlet 14. The presence of water in the upper portion of the chamber 31 functions to dampen rapid upward movement of the valving member 45 in the chamber 31, thereby limiting oscillation of the valving member 45 in the chamber 31 due to rapid changes in fluid pressure and/or flow rates. Furthermore, a pressure recovery plenum is provided by an outwardly-offset portion 47a of the wall 47 which surrounds the valving member 45 and defines a recess 31a. It is noted that the width of the recess 31a is less than the thickness of the valving member 45 so that the annular flange 45a and its extensions 45c,45c engage the chamber wall 47 above the top of the recess 31a when the valving member 45 is in its lower limit position.

As noted above, the proportioning apparatus 10 is compact and is, therefore, capable of being installed in confined spaces. For this purpose, the pressure-comparing chamber 28 and bypass valve 20 are located immediately above the proportioning chamber 31. As best seen in FIG. 3, the lower portion of the pressure-comparing chamber 28 is provided by an upwardly-open central recess in the transverse wall 49, and the upper portion of the chamber 28 is provided by a housing 60 having a downwardly open recess. The housing 60 is fastened to the wall 48 by a plurality of bolts 61,61 which also mount the diaphragm 27 in the chamber 28. The wall 49 in turn is fastened to the body of the proportioning apparatus 10 by a series of bolts 62,62 which are spaced apart about its periphery and which permit the wall 49 to be removed to afford access to the interior of the chamber 31 for installing the valving member 45 and the plates 35 and 36. The housing 60 has an internally-threaded lateral boss 65 which receives the foam additive supply conduit 24, and the housing 60 has a vertically-disposed internally-threaded outlet 66 which is connected to the foam liquid return conduit 21. The foam additive pressure-sensing conduit 25 which is illustrated schematically in FIG. 1, extends vertically in the housing to connect the inlet 65 with the upper end of the pressure-comparing chamber 28.

The bypass valve assembly 20 is contained within the housing 60 and is designed so that pressure in the valving chamber does not affect adversely the operation of the valve. For this purpose, the valve assembly 20 comprises an elongated vertically-disposed spool member 68 which is slidably mounted in an inlet extension or valving chamber 71 having a closed end 71a and a pair of vertically-spaced aligned upper and lower bores 69 and 70, respectively. The upper bore 69 is provided in a seat member 72 which threads into the upper portion of the inlet extension 71, and the lower bore 70 is provided in the lower portion of the inlet extension 71. As best seen in FIG. 3, the spool member 68 has a pair of diametrically-opposed, longitudinally-extending flutes 68a,68a, and the spool member 68 has an upper shoulder 76 and a lower shoulder 77 at opposite ends of the flutes 68a, 68a. The flutes 68a,68a cooperate with the lower bore 70 to provide downwardly-open flow passages when the spool 68 is in the full line position illustrated and the bypass valve 20 is open. The spool member 68 also has a neck portion 68c with a pair of diametrically-opposed recesses 68b,68b which cooperate with the upper bore 69 to provide upwardly-open flow passages when the valve 20 is open, as illustrated. A flow passage 75 is provided around the closed end 71a of the inlet extension 71 to permit fluid flowing out the lower bore 70 to flow upwardly to conjoin fluid flowing out the upper bore 69 before exiting the valve outlet 66. The upper shoulder 76 of the spool member 68 is chamfered to seat against a similarly-chamfered seat in the bottom of the seat member 72, and the lower shoulder 77 of the spool member 68 is sized as to be received within the lower bore 70 to block fluid flow therethrough. The seat member 72 is threaded into the inlet extension 71 and is therefore adjustable axially of the spool 68 in order to permit the spool 68 to close off both the upper and lower outlets 69 and 70 substantially simultaneously. In the illustrated embodiment, the spool member 68 is preferably machined integrally with the operator stem 29 which is connected at its lower end to the diaphragm 27 in the chamber 28 so that movement of the diaphragm 27 upwardly closes the bypass valve 20 and movement of the diaphragm downwardly opens the bypass valve. The diameters and hence cross-sectional areas of the neck 68c and the operator 29 are both smaller than the diameter of the spool member 68, and the difference between the areas corresponds to the cross sectional areas of the operator 29. The area of the operator 29 designated $A_1$ is preferably made as small as practical and the area $A_2$ of the spool member 68 is chosen in accordance with the requirements to provide for a predetermined flow of 100 GPM at a 50 psi pressure differential. Thus, with these two requirements established, the cross sectional area of the neck 68c of the member 68, designated $A_3$ can be calculated since it is the difference of $A_2$ minus $A_1$. Thus, when the water pressure below the diaphragm 27 corresponds to the foam additive pressure above the diaphragm 27, the operator 29 positions the spool member 68 as indicated in full in FIG. 3 to return a certain amount of liquid foam to the supply tank 17, thereby supplying liquid foam to the reservoir 22 at a predetermined pressure related to the water supply pressure. In the event of a decrease in the water pressure at the inlet 11 of the apparatus 10, the diaphragm 27 displaces the spool 68 downwardly to cause more liquid foam to be returned to the tank 17 through the return line 21, thereby dropping the pressure of the foam liquid at the reservoir 22 an amount corresponding to the magnitude of the decrease in water pressure. Conversely, an increase in the water inlet pressure causes the diaphragm 27 to displace the spool member 68 upwardly to restrict the flow of liquid foam through the return line 21 for increasing the pressure of the foam liquid in the reservoir 22. In this manner, the bypass valve 20 functions to modulate the pressure of this foam liquid in the reservoir 22 so that it corresponds to the pressure of the water at the inlet 11 of the apparatus 10, and because of the above-noted area differences, the spool member 68 is balanced so that pressure in the valving chamber 71 does not affect movement of the diaphragm.

As a non-limiting example, the annular port 32 preferably has an area of 20.65 in², and the orifice 41 has an area of 1.4 in². The angle of the tapered surface 48a on the plug 48 of the valving member 45 is preferably 5°, relative to the axis A for a 6/94 foam-water mixture. The gross weight of the valving member depends, of course, on the aforementioned areas and desired opening pressure. Preferably, the weight corresponds substantially to the total of the areas multiplied by 2 psi to ensure opening at 2 psi differential across the valving member 45.

Figure 6:
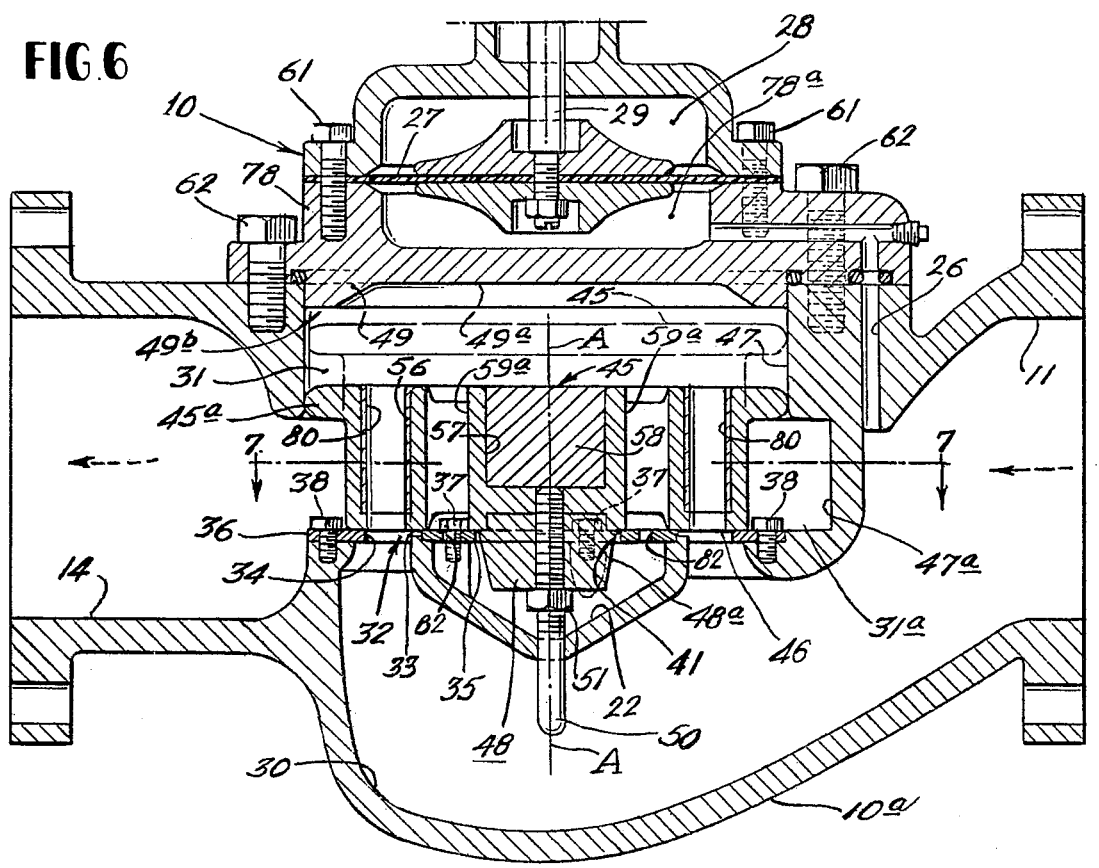
FIG. 6 is a longitudinal sectional view of a modified form of proportioning apparatus in accordance with the present invention.
Figure 7:
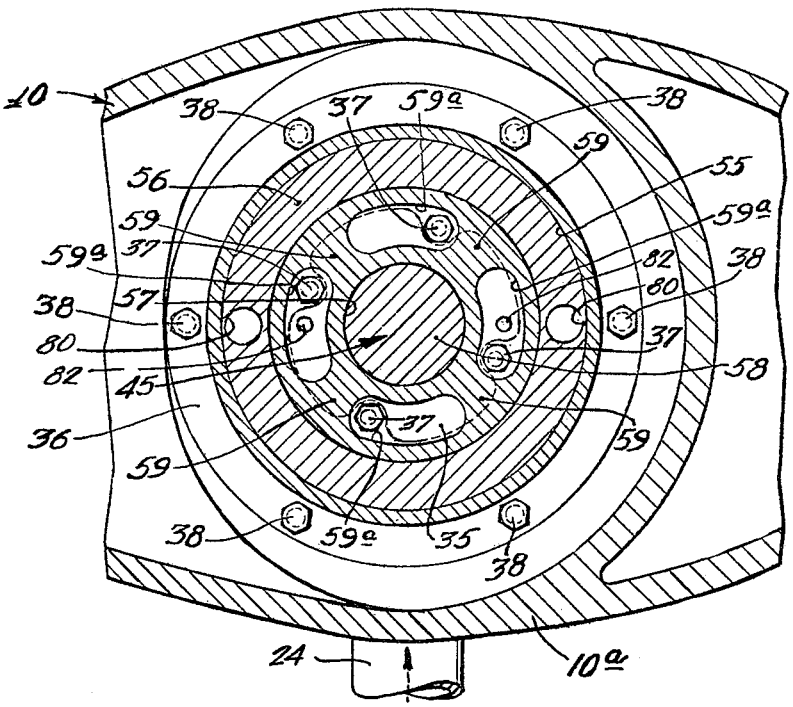
FIG. 7 is a sectional view taken on lines 7—7 of FIG. 6.

There is illustrated in FIGS. 6 and 7 a modified arrangement of plural fluid proportioning apparatus in accordance with the present invention. The basic parts and arrangement thereof in the system are identical to that described previously and hence identical reference numerals have been used in these views of the drawings. In the present instance, however, there is provided a bypass passage arrangement to facilitate "fine tuning" of the system at extremely low flow rates, i.e., in the range below 100 GPM. With a weighted valve member 45 as determined above, demand flows at the nozzle 16 in the lower range do not establish a sufficient pressure drop between the inlet and outlet lines to lift the valve 45. Under these circumstances, in order to provide flow through the system, the valving member is provided with preferably two diametrically opposed first bypass ports or passages 80 which, as illustrated, provide fluid communication through the port 32 between the inlet 11 and the chamber 31 in the closed position. Additionally, preferably two diametrically opposed second bypass ports or passages 82 are provided in the valve plate 35 to establish fluid communication between the liquid foam additive reservoir 22 and the chamber 31. The bypass passages 80 and 82 are preferably of a cross sectional area of ratio corresponding to the desired proportion of foam additive to primary fluid. Thus, for a desired proportion of foam additive to water of 6 parts liquid foam additive to 94 parts of a primary fluid, i.e., water, the bypass passage 80 may be of one inch diameter and the bypass passage 82 of 0.25 inches diameter. This provides an area ratio of approximately 16 to 1 and flow of the primary fluid of from 20 GPM to 100 GPM and flow of 1–5 GPM of foam liquid additive.

In view of the foregoing description and test data, it should be apparent that there has now been provided improved proportioning apparatus for use in a foam-water fire fighting system. The apparatus is capable of mixing foam additive with water in a relatively constant proportion over a wide range of flow rates for the foam-water mixture. In addition, the proportioning apparatus is constructed to operate with a mimimum of pressure drop so as to insure adequate discharge pressure at the nozzle for effectively distributing the foam-water mixture. A novel weighted valve has been provided, and an improved balancedpressure bypass valve has been provided also.

While a preferred embodiment of the present invention has been described in detail, various modifications, alterations, or changes may be made without departing from the spirit and scope of the present invention as defined in the appended claims.

I claim:

1. Apparatus for mixing a primary fluid with a secondary fluid in a predetermined proportion; comprising:
   a body having an inlet and a cavity in fluid communication with said inlet, said body also having an outlet and a chamber in fluid communication with said outlet;
   primary seat means defining a primary port providing fluid communication between said cavity and said chamber;
   valving means extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;
   means applying a substantially constant force to said valving means in the direction of said cavity for biasing the same into said flow blocking position;
   means providing a reservoir in said cavity for containing a secondary fluid to be proportioned with said primary fluid in said chamber;
   means associated with said reservoir and providing a secondary port opening into said chamber interiorly of said primary port;
   plug means carried by said valving means and disposed within said secondary port for cooperating therewith to meter the flow of said secondary fluid from said reservoir and into said chamber in relation to the spacing of said valving means from said primary port as determined by the flow of primary fluid;
   conduit means for flowing said secondary fluid into said reservoir and through said secondary port for mixing with said primary fluid in said chamber;
   means for supplying said secondary fluid under pressure;
   control valve means associated with said supply means and said conduit means to said reservoir for regulating the pressure of said secondary fluid in said reservoir; and
   means for actuating said control valve means in response to changes in pressure to said primary fluid to increase said secondary fluid pressure in response to an increase in the pressure of said primary fluid and to decrease said secondary fluid pressure in response to a decrease in the pressure of said primary fluid;
   whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber.

2. Apparatus according to claim 1 wherein said chamber overlies said cavity and said force applying means includes a weight of a predetermined magnitude carried by said valving means to seat said valving means against its primary seat means by gravity.

3. Apparatus according to claim 2 wherein said inlet opens laterally into said cavity and said outlet opens laterally into said chamber so that the primary fluid flows through the primary port in a direction transverse to its flow path into the body.

4. Apparatus according to claim 1 wherein said actuating means includes means for sensing the pressure of said primary fluid adjacent said inlet, means for sensing the pressure of said secondary fluid upstream of said reservoir, means for comparing said sensed pressures, and operator means responsive to said pressure comparing means for opening and closing said control valve means to regulate the pressure of said secondary fluid in said reservoir.

5. Apparatus according to claim 4 wherein said pressure comparing means includes a pressure chamber and a diaphragm extending across said pressure chamber, said primaryfluid pressure-sensing means communicating pressure to one side of said diaphragm in said pressure chamber and said secondaryfluid pressure-sensing means communicating pressure to the other side of said diaphragm in said pressure chamber, said operator means being connected to said diaphragm so that said control valving means moves in response to flexure of said diaphragm in said pressure comparing chamber.

6. Apparatus for mixing a primary fluid with a secondary fluid in a predetermined proportion; comprising:
a body having an inlet and a cavity in fluid communication with said inlet, said body also having an outlet and a chamber overlying said cavity and in fluid communication with said outlet;
said inlet opening laterally into said cavity and said outlet opening laterally into said chamber so that the primary fluid flows through the primary port in a direction transverse to its flow path into the body;
primary seat means defining a primary port providing fluid communication between said cavity and said chamber;
valving means having a planar surface confronting said primary seat means and extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;
means including a weight of a predetermined magnitude carried by said valving means applying a substantially constant force to said valving means in the direction of said cavity for urging the same into said flow blocking position by gravity;
means providing a reservoir in said cavity for containing a secondary fluid to be proportioned with said primary fluid in said chamber;
means associated with said reservoir and providing a secondary port opening into said chamber interiorly of said primary port;
said primary port having an annular configuration about an axis extending in the direction of movement of said valving means and said secondary port being located coaxially of said primary port;
plate means disposed between said cavity and said chamber transverse to the path of movement of said valving means, said plate means having spaced confronting edges providing said primary port with said annular shape and having another edge defining said secondary port with a circular shape;
plug means carried by said valving means and disposed within said secondary port for cooperating therewith to meter the flow of said secondary fluid from said reservoir and into said chamber in relation to the spacing of said valving means from said primary port as determined by the flow of primary fluid;
said plug having a tapered peripheral surface about said axis depending below the level of said planar surface into said secondary port and said secondary port having a shape corresponding to said surface for cooperating therewith to define an annular flow passage having a variable area dependent on the spacing of said valving means from its port with the area increasing as the spacing increases between the valving means and its seat; and
conduit means for flowing said secondary fluid into said reservoir and through said secondary port for mixing with said primary fluid in said chamber;
whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber.

7. Apparatus for mixing a primary fluid with a secondary fluid in a predetermined proportion; comprising:
a body having an inlet and a cavity in fluid communication with said inlet, said body also having an outlet and a chamber in fluid communication with said outlet;
primary seat means defining a primary port providing fluid communication between said cavity and said chamber;
valving means extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;
means applying a substantially constant force to said valving means in the direction of said cavity for urging the same into said flow blocking position;
means providing a reservoir in said cavity for containing a secondary fluid to be proportional with said primary fluid in said chamber;
means associated with said reservoir and providing a secondary port opening into said chamber interiorly of said primary port;
plug means carried by said valving means and disposed within said secondary port for cooperating therewith to meter the flow of said secondary fluid from said reservoir and into said chamber in relation to the spacing of said valving means from said primary port as determined by the flow of primary fluid;
conduit means for flowing said secondary fluid into said reservoir and through said secondary port for mixing with said primary fluid in said chamber;
whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber;
control valve means associated with said supply means and said conduit means to said reservoir for regulating the pressure of said secondary fluid in said reservoir; and
means for actuating said control valve means in response to changes in pressure of said primary fluid to increase said secondary fluid pressure in response to an increase in the pressure of said primary fluid and to decrease said secondary fluid pressure in response to a decrease in the pressure of said primary fluid.

8. Apparatus for mixing a primary fluid with a secondary fluid in a predetermined proportion; comprising:
a body having an inlet and a cavity in fluid communication with said inlet, said body also having an outlet and a chamber in fluid communication with said outlet;
primary seat means defining a primary port providing fluid communication between said cavity and said chamber;

valving means extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;

means applying a force to said valving means in the direction of said cavity for urging the same into said closed position;

means providing a reservoir in said cavity for containing a secondary fluid to be proportioned with said primary fluid in said chamber;

means associated with said reservoir and providing a secondary port opening into said chamber interiorly of said primary port;

plug means carried by said valving means and disposed within said secondary port for cooperating therewith to meter the flow of said secondary fluid from said reservoir and into said chamber in relation to the spacing of said valving means from said primary port as determined by the flow of primary fluid;

conduit means for flowing said secondary fluid into said reservoir and through said secondary port for mixing with said primary fluid in said chamber;

whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber;

first bypass port means in said valving member establishing fluid communication between said inlet and said outlet for said primary fluid when said valving means is in a closed position and second bypass port means establishing fluid communication between said secondary fluid reservoir and said chamber, said first port means being of a greater cross sectional area than said second bypass port means and said first and second bypass ports being of a predetermined relative cross sectional area to provide flow therethrough in relation to the predetermined ratio of said fluids mixed in said chamber.

9. A valve for mixing a primary fluid with a secondary fluid in a predetermined proportion comprising: a body having a first inlet for primary fluid and a second inlet for secondary fluid and an outlet, separate port means providing fluid communication between said first and second inlets and said outlet, a valving member extending across said first and second port means and mounted in a chamber for vertical movement in response to fluid flow through said port means, means carried by said valving member to bias said member into a lower limit position normally closing fluid flow through said port means, means slidably mounting said valving member for said vertical movement in said chamber, first bypass port means in said valving member establishing fluid communication between said first inlet and said outlet for said primary fluid and second bypass port means establishing fluid communication between said second inlet and said outlet when said valving means is in its lower closed position, said first bypass means being of a greater cross sectional area than said second bypass port means and said first and second bypass ports being of a predetermined relative cross sectional area to provide flow therethrough in relation to the predetermined ratio of said primary and secondary fluids.

10. A balanced pressure valve, comprising:

a valve body having a valving chamber with aligned outlets spaced from one another and an inlet into said chamber between said outlets.

a spool displaceable axially in said chamber, said spool having one end slidably received in one of said outlets and a neck at its other end slidably received in the other one of said outlets.

an operator having an outer end portion extending axially from said one end of said spool for displacing said spool in said chamber, said neck and operator each having a cross-sectional area smaller than the cross-sectional area of said spool, said neck and operator each having different cross-sectional areas with the difference between the spool area and the neck area corresponding to the area of the operator, whereby the spool is balanced in the valving chamber when the same pressure is applied in the valve chamber and to the outer end portion of the operator.

11. Apparatus for mixing a primary fluid with a secondary fluid in a predetermined proportion; comprising:

a body having an inlet and a cavity in fluid communication with said inlet, said body also having an outlet and a chamber in fluid communication with said outlet;

said inlet opening laterally into said cavity and said outlet opening laterally into said chamber so that the primary fluid flows through the primary port in a direction transverse to its flow path into the body;

primary seat means defining a primary port providing fluid communication between said cavity and said chamber;

said primary port having an annular configuration about an axis extending in the direction of movement of said valving means and said secondary port being located coaxially of said primary port;

valving means extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;

means applying a force to said valving means in the direction of said cavity for urging the same into said closed position;

said chamber overlying said cavity and said force applying means including a weight of a predetermined magnitude carried by said valving means to seat said valving means against its primary seat means by gravity;

means providing a reservoir in said cavity for containing a secondary fluid to be proportional with said primary fluid in said chamber;

means associated with said reservoir and providing a secondary port opening into said chamber interiorly of said primary port;

plug means carried by said valving means and disposed within said secondary port for cooperating therewith to meter the flow of said secondary fluid from said reservoir and into said chamber in relation to the spacing of said valving means from said primary port as determined by the flow of primary fluid;

conduit means for flowing said secondary fluid into said reservoir and through said secondary port for mixing with said primary fluid in said chamber;

whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber.

12. Apparatus according to claim 11 wherein said plug having a tapered peripheral surface about said axis and said secondary port having a shape corresponding to said surface for cooperating therewith to define an annular flow passage having a variable area dependent on the spacing of said valving means from its port with the area increasing as the spacing increases between the valving means and its seat.

13. Apparatus according to claim 12 wherein said valving means has a planar surface confronting said primary seat means and said plug surface depending below the level of said planar surface into said secondary port.

14. The apparatus according to claim 13 including plate means disposed between said cavity and said chamber transverse to the path of movement of said valving means, said plate means having spaced confronting edges providing said primary port with said annular shape and having another edge defining said secondary port with a circular shape.

15. Apparatus according to claim 14 wherein said plate means includes an annular inner plate element having said other edge defining said secondary port and an annular outer plate element cooperating with said inner plate for defining said primary port, and including means removably mounting said plates to said body to afford ready removal and replacement of said plates.

16. Apparatus for mixing a primary fluid with a secondary fluid in a predetermined proportion; comprising:

a body having an inlet and a cavity in fluid communication with said inlet, said body also having an outlet and a chamber in fluid communication with said outlet;

primary seat means defining a primary port providing fluid communication between said cavity and said chamber;

valving means extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;

said valving means having one dimension in its path of movement and another dimension transverse to its path of movement, said one dimension being less than the other, and including means constraining said valving means for movement in a predetermined path relative to said primary port while preventing said valving means from tilting as it moves;

said constraining means including surface means in said chamber surrounding the periphery of said valving means for slidably receiving the same, a stem extending in the path of movement of said valving means, and bearing means spaced from said surface means for slidably receiving said stem;

means applying a force to said valving means in the direction of said cavity for urging the same into said closed position;

means providing a reservoir in said cavity for containing a secondary fluid to be proportioned with said primary fluid in said chamber;

means associated with said reservoir and providing a secondary port opening into said chamber interiorily of said primary port;

plug means carried by said valving means and disposed within said secondary port for cooperating therewith to meter the flow of said secondary fluid from said reservoir and into said chamber in relation to the spacing of said valving means from said primary port as determined by the flow of primary fluid;

conduit means for flowing said secondary fluid into said reservoir and through said secondary port for mixing with said primary fluid in said chamber;

whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber.

17. Apparatus according to claim 16 wherein said surface means has a recess around the valving means and said outlet opens into said recess, said recess having a widthwise dimension less than said one dimension of said valving means so that said surface means engages the valving means a spaced distance from its primary seat when said valving means is in its flow blocking position, said bearing means being located in said reservoir and said stem extending into said reservoir through said port, whereby the valving means is guided positively as it moves toward and away from its primary seat.

18. Apparatus for mixing a primary fluid with a secondary fluid in a predetermined proportion; comprising:

a body having an inlet and a cavity in fluid communication with said inlet, said body also having an outlet and a chamber in fluid communication with said outlet;

primary seat means defining a primary port providing fluid communication between said cavity and said chamber;

valving means extending across said primary port and mounted in said chamber for movement between a closed position blocking fluid communication through said port from said cavity and to said chamber and a variable open position spaced from said port affording fluid communication through said port so that the primary fluid may be flowed through said body from said inlet to said outlet;

said body having a wall extending transversely to the path of movement of the valving means a spaced distance from said primary port means and abutment surface means disposed in the path of movement of said valving means for engaging said valving means to limit movement thereof away from said primary port and to define a space between said valving means and said wall when said valving means is in its outer limit position, and including at least one fluid passage in said valving means to afford fluid communication between said cavity and said space for controlling the pressure differential on opposite sides of said valving means to dampen movement of said valving means;

means applying a force to said valving means in the direction of said cavity for urging the same into said closed position;

means providing a reservoir in said cavity for containing a secondary fluid to be proportioned with said primary fluid in said chamber;

means associated with said reservoir and providing a secondary port opening into said chamber interiorly of said primary port;

plug means carried by said valving means and disposed within said secondary port for cooperating therewith to meter the flow of said secondary fluid from said reservoir and into said chamber in relation to the spacing of said valving means from said primary port as determined by the flow of primary fluid;

conduit means for flowing said secondary fluid into said reservoir and through said secondary port for mixing with said primary fluid in said chamber;

whereby primary fluid flowing through the apparatus displaces the valving means into a predetermined position corresponding to the rate of primary fluid flow for positioning the plug means at a predetermined position with respect to the secondary port, thereby accurately metering the amount of secondary fluid mixed with primary fluid in the chamber.

19. A balanced pressure valve, comprising:
a valve body having a valving chamber with aligned outlets spaced from one another and an inlet into said chamber between said outlets,
a spool displaceable axially in said chamber, said spool having one end slidably received in one of said outlets and a neck at its other end slidably received in the other one of said outlets,
an operator extending axially from said one end of said spool for displacing said spool in said chamber,
said spool having one shoulder between its one end and said operator and another shoulder between its other end and said neck, said neck and spool being shaped to cooperate with said outlets for defining flow passages therebetween when said valve is in its open flow position with said spool shoulders spaced from said outlets, and said shoulders being shaped for cooperating with said outlets to block fluid flow therethrough when said valve is in its closed flow position with said one spool shoulder received within its associated outlet,
said neck and operator each having a cross-sectional area smaller than and different from the cross-sectional area of said spool with the difference between the spool area and the neck area corresponding to the area of the operator,
whereby the spool is balanced in the valving chamber when the same pressure is applied in the chamber and to one end of the operator.

20. A valve according to claim 19 wherein said spool has a pair of diametrically-opposed flutes extending axially between its shoulders, and said neck has a pair of axially-extending diametrically-opposed recesses, said flutes and recesses cooperating with said outlets to provide said flow passages when said valve is in its open flow position.

21. A valve according to claim 19 including means mounting said neck-receiving outlet for adjustment axially of said spool to enable said outlets to be located so as to be opened and closed substantially simultaneously by said spool shoulders.

22. A balanced pressure valve, comprising:
a valve body having a valving chamber with aligned outlets spaced from one another and an inlet into said chamber between said outlets,
a spool displaceable axially in said chamber, said spool having one end slidably received in one of said outlets and a neck at its other end slidably received in the other one of said outlets,
an operator extending axially from said one end of said spool for displacing said spool in said chamber,
said neck and operator each having a cross-sectional area smaller than and different from the cross-sectional area of said spool with the difference between the spool area and the neck area corresponding to the area of the operator,
pressure-responsive means connected on one side to said operator for displacing said spool in said chamber, and means for applying a pressure on the other side of said pressure-responsive means, whereby said spool is balanced in an open position in said valving chamber when pressure in the valving chamber corresponds to the pressure on the other side of the pressure-responsive means.

23. A valve according to claim 22 wherein said valve body has a flow passage providing fluid communication between said outlets for conjoining fluid flowing therethrough into a single valve outlet, and said valve body has a pressure chamber and a diaphragm mounted in said pressure chamber to provide said pressure-responsive means.

24. A valve comprising:
a body having an inlet cavity and an outlet chamber overlying said inlet cavity, an annular port providing fluid communication between said chamber and said cavity, a valving member extending across said port and mounted in said chamber for vertical movement in response to fluid flow through said port, means carried by said valving member to bias said member into a lower limit position blocking fluid flow through said port, means slidably mounting said valving member for said vertical movement in said chamber,
said valving member having a disc-like configuration and said slidable mounting means including surface means defining said chamber and surrounding said valving member at a level spaced from said port, and including bearing means spaced from said surface means at another level and associated with said valving member for cooperating therewith to prevent the same from tilting as it moves in the chamber.

25. A valve according to claim 24 wherein said valving member has a plurality of relatively thin peripherally-spaced extensions engaging said surface means at spaced locations and said biasing means includes a mass having its center of gravity located below said extensions.

26. A valve according to claim 25 including an elongated stem depending from said valving member and slidably received by said bearing means at said other level below said port.

27. A valve according to claim 26 including means defining an orifice interiorly of said port and a reservoir below said orifice, a tapered plug surrounding said stem and extending into said reservoir through said orifice, and means associated with said stem for removably mounting said plug.

28. A valve according to claim 27 wherein said stem is located centrally of said valving member, and said plug has a frusto-conical shape with a base on one end mounted to the valving member, said plug-mounting means including threaded means engaging the other end of said plug for urging said plug into engagement with said valving member.

29. A valve according to claim 27 wherein said plug has a predetermined lengthwise dimension between its ends and including means associated with said valving member to limit upward movement in said chamber to a distance corresponding to said lengthwise dimension to prevent the lower end of the plug from elevating above the level of the orifice in the normal course of operation of the valve.

* * * * *